United States Patent [19]

Yoshino

[11] Patent Number: 5,401,131
[45] Date of Patent: Mar. 28, 1995

[54] EXPANSION ANCHOR
[75] Inventor: Yousuke Yoshino, Kawagoe, Japan
[73] Assignee: Yoshino Seiki Inc., Saitama, Japan
[21] Appl. No.: 87,867
[22] Filed: Jul. 9, 1993
[30] Foreign Application Priority Data Jul. 10, 1992 [JP] Japan .................. 4-183689

[51] Int. Cl.⁶ .................. F16B 13/04; F16B 13/06
[52] U.S. Cl. .................. 411/38; 411/55; 411/60
[58] Field of Search .................. 411/34, 37, 38, 55, 411/57, 60, 61, 54

[56] References Cited

U.S. PATENT DOCUMENTS

| | | | |
|---|---|---|---|
| 1,320,623 | 11/1919 | Kennedy | 411/38 |
| 1,365,719 | 1/1921 | Ogden | 411/34 |
| 1,419,979 | 6/1922 | Ogden | 411/38 |
| 1,431,176 | 10/1922 | Ogden | 411/38 |
| 2,150,866 | 3/1939 | Sipe | 411/34 |
| 2,343,143 | 2/1944 | Gill | 411/38 |

FOREIGN PATENT DOCUMENTS

| | | |
|---|---|---|
| 2508992 | 1/1983 | France . |
| 2535237 | 2/1977 | Germany . |
| 613232 | 11/1948 | United Kingdom . |

Primary Examiner—Neill R. Wilson
Attorney, Agent, or Firm—Wenderoth, Lind & Ponack

[57] ABSTRACT

An expansion anchor including an anchor stem having a holding flange and a lock member having a corrugated portion is inserted into a fitting hole bored in concrete or another rigid material. The anchor is secured in the bore by forcing the lock member to squash the corrugated portion. The corrugated portion thus squashed expands into engagement with the inner surface defining the bore so that the expansion anchor is steadily secured in a non-removable state.

7 Claims, 10 Drawing Sheets

F I G. 10
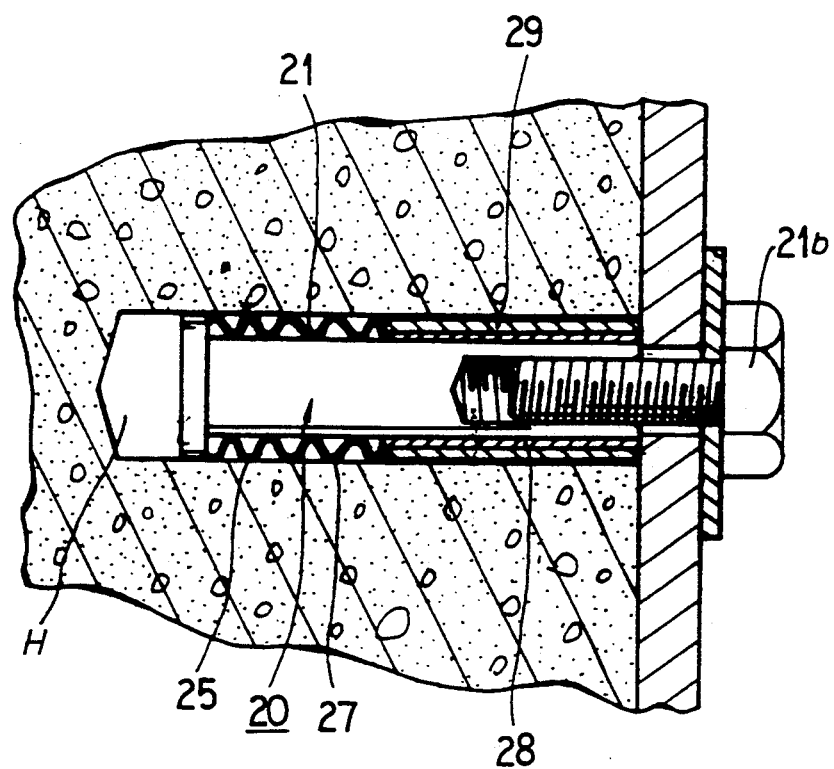

EXPANSION ANCHOR

BACKGROUND OF THE INVENTION

1. Field of the Invention

This invention relates to an expansion anchor capable of being expanded in a fitting hole bored in a foundation of concrete, stone, porcelain tile or other rigid materials so as to be secured in a non-removable state.

2. Description of the Prior Art

There has been generally known an expansion anchor of this type which comprises a cylindrical anchor body 1 having an axial hole 1a, longitudinal slits 1b and a contracted portion 1c, and a pin member 2 to be thrust into the axial hole 1a, as shown in FIG. 1. Upon inserting the anchor body 1 into a fitting hole H bored in a rigid material B such as concrete, the pin member 2 is forced into the axial hole 1a of the anchor body 1, causing the anchor body 1 to expand and come into frictional contact with the inner wall surface of the rigid material B defining the fitting hole H in a non-removable state.

There has been another type of the expansion anchor comprising a cylindrical anchor body 3 having an axial hole 3a and longitudinal slits 3b, and a wedge plug 5 connected to a threaded bolt 4, as shown in FIG. 2. By turning the threaded bolt 4, the wedge plug 5 is drawn into the axial hole 3a of the anchor body 3, causing to expand and be secured the anchor body 3 in the fitting hole.

In any conventional expansion anchor, only one part of the outer peripheral surface of the cylindrical anchor body is expanded by the pin member or wedge plug forced into the anchor body. That is, the anchor body is partially expanded to be fastened to the rigid material. In substance, only the leading edge portion of the anchor body is expanded and comes into partial engagement with the inner wall surface defining the fitting hole. Thus, the engaging strength brought about by the expansion anchor is not sufficient for uniting the anchor body with the rigid material.

Hence, the conventional expansion anchor in the expanded state in the fitting hole of the rigid material cannot be steadily secured when the fitting hole is not accurately formed or the rigid material is frail, or will possibly come out easily from the fitting hole due to various external causes such as vibrations.

The conventional expansion anchor of this type is generally provided on the outer surface of the anchor body 1 or 3 with checking steps 1d or 3d to increase the frictionally engaging strength relative to the rigid material, as illustrated in FIG. 1 and FIG. 2. However, the anchor is nonetheless not reliably secured to the rigid material, because the anchor body is partly engaged at the leading edge portion thereof with the rigid material, all the same, as described above.

SUMMARY OF THE INVENTION

One object of this invention is to provide an expansion anchor which can be steadily secured with great hooking strength to various rigid materials such as of concrete, stone and porcelain tile in non-removable state by a simple operation.

To attain the object described above according to this invention, there is provided an expansion anchor comprising an anchor stem having a holding flange, and a cylindrical lock member having a corrugated portion. The anchor stem is inserted into the cylindrical lock member so that the lock member can be held between the holding flange and a nut fitted to a thread formed on the rear end portion of the anchor stem. Upon inserting the anchor thus assembled into a fitting hole bored in a rigid material, the nut is tightened up, thus narrowing the interval between the holding flange and the nut, thereby squashing the corrugated portion. As a result, the corrugated portion is expanded outwardly and forms ridged engaging teeth which bite into the inner wall surface defining the fitting hole bored in the rigid material such as concrete. Consequently, the expansion anchor is secured in the fitting hole in a non-removable state. That is, the expansion anchor is stably secured in the fitting hole by the ridged engaging teeth biting into the rigid material.

Other and further objects of this invention will become obvious upon an understanding of the illustrative embodiments about to be described, and various advantages not referred to herein will occur to one skilled in the art upon practicing the invention.

BRIEF DESCRIPTION OF THE DRAWINGS

FIG. 10 is a similar view of the expansion anchor of FIG. 8, with the corrugated portion squashed.

DETAILED DESCRIPTION OF THE PREFERRED EMBODIMENTS

Figure 1:
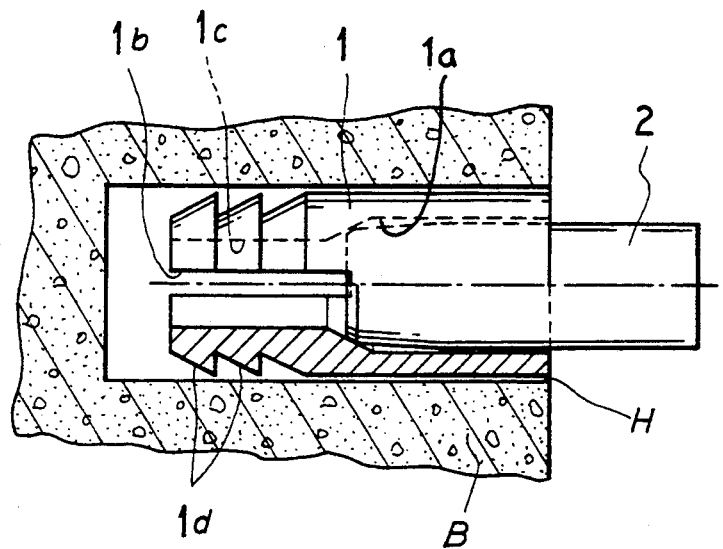
FIG. 1 is a side view, partly in section, of a conventional expansion anchor.
Figure 2:
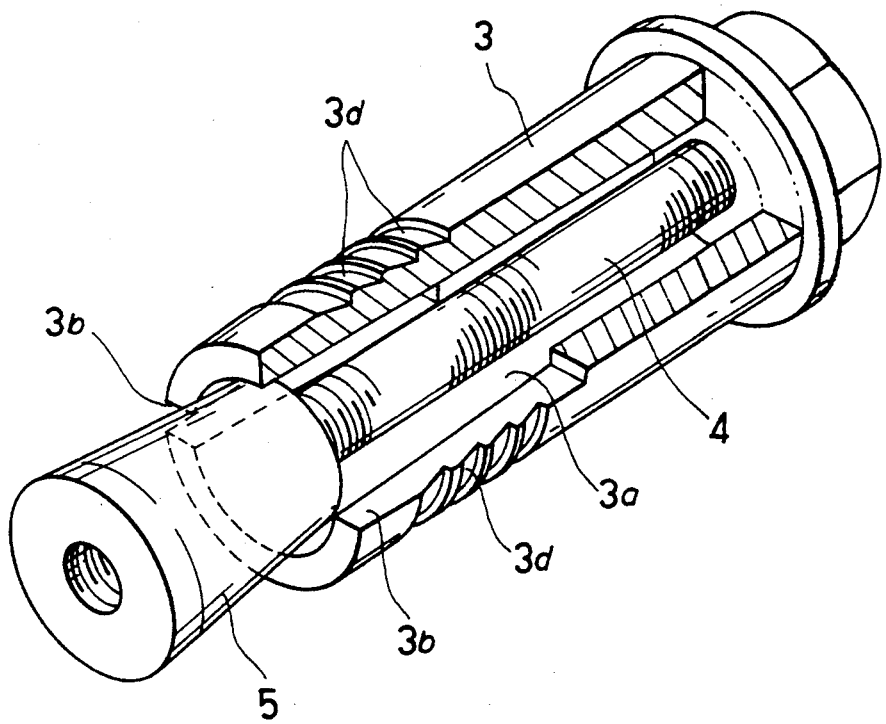
FIG. 2 is a partly cutaway perspective view of another conventional expansion anchor.

The present invention will become more fully understood from the detailed description given hereinbelow and the accompanying drawings which are given by way of illustration only, and thus are not limitative of the present invention.

FIG. 3 through FIG. 6 show a first embodiment of the expansion anchor according to this invention. In the illustrated embodiment, the expansion anchor of this invention is secured to, for example, a concrete foundation B having a fitting hole H. However, the material of the foundation B to which the anchor is secured should not be understood as limitative, and the expansion anchor of this invention can be applied to any rigid material.

The expansion anchor 10 comprises a rod-shaped anchor stem 11 having a rear part with a screw thread (screw portion) 11a, a cylindrical lock member 15 into which the anchor stem 11 is inserted, and a driving collar 19 into which the lock member 15 is inserted.

The anchor stem 11 is provided at its leading end with a holding flange 16 for retaining the cylindrical lock member 15 between itself and a nut 11b fitted to the threaded screw portion 11a.

The cylindrical lock member 15 has an inner diameter somewhat larger than the outer diameter of the anchor stem 11 and comprises a corrugated portion 17 and a straight portion 18 extending longitudinally backward from the corrugated portion 17. Further, the lock member 15 has longitudinal expanding slits 15a.

The driving collar 19 has an inner diameter nearly equal to the outer diameter of the straight portion 18 of the lock member 15 so that the lock member 15 can be fitted in the driving collar 19.

The corrugated portion 17 comprises ridge portions 17a forming the maximum (outer) diameter of the lock member 15 and furrow portions 17b forming the minimum (inner) diameter of the lock member 15, which are respectively arranged in the substantially same pitch in a bellows shape. When the corrugated portion 17 is pressed in the longitudinal direction thereof, it is squashed expanding the ridge portions 17a and furrow portions 17b outward and inward, respectively. Consequently, the outer diameter of the corrugated portion 17 is increased.

The lock member 15 may be made, for instance, by subjecting a plate of metal or other material to roll forming so as to simultaneously form the corrugated portion 17 and the straight portion 18. The lock member 15 was, in practice, made of a copper plate having a thickness of 0.5 mm, with the slits 15a take having a width of 0.5 mm.

A washer 14 is used along with the nut 11b, but is by no means necessary.

Next, the procedure for securing a panel P onto a concrete foundation B by use of the expansion anchor 10 as noted above will be described with reference to FIG. 5 and FIG. 6.

Figure 5:
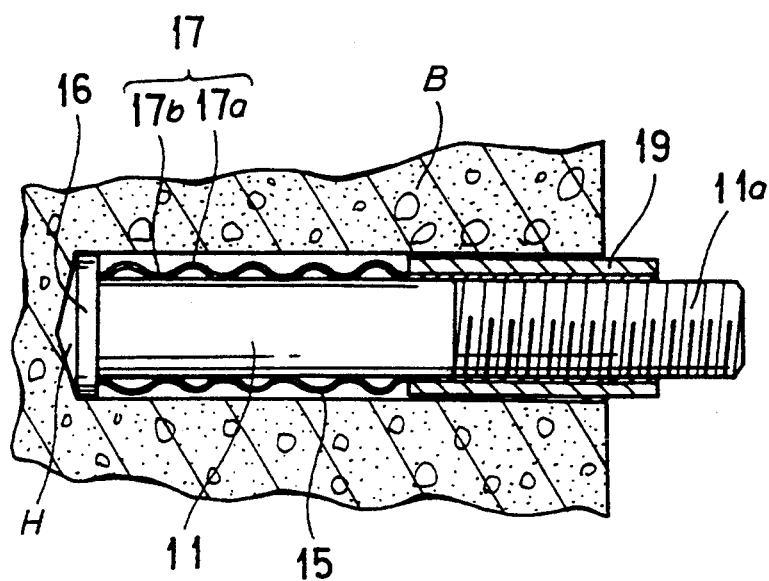
FIG. 5 is a side view, partly in section, of the expansion anchor of FIG. 3, having the corrugated portion of a lock member before being squashed.
Figure 6:
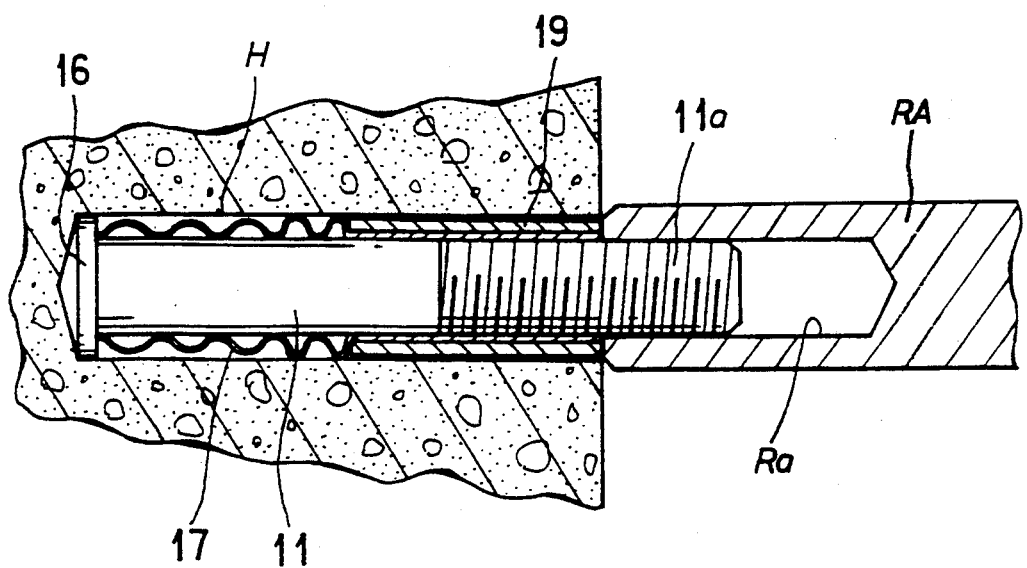
FIG. 6 is a similar view of the expansion anchor of FIG. 3, with the corrugated portion in the squashed state.

First of all, a fitting hole H is bored in the concrete foundation B. The fitting hole H has a depth somewhat smaller than the entire length of the expansion anchor 10 comprising the united anchor stem 11, lock member 15 and driving collar 19. Then, the expansion anchor 10 having the nut 11b removed from the threaded screw portion 11a is inserted into the fitting hole H until the holding flange 16 comes into contact with the surface defining the bottom of the fitting hole H, so that the rear end part of the expansion anchor 10 is left out of the hole H as shown in FIG. 5. The expansion anchor 10 thus inserted in the hole H is driven by use of a striking tool RA having a recess Ra for receiving the rear end portion of the threaded screw 11a, as illustrated in FIG. 6. As a result, the rear end portion of the corrugated portion 17 is squashed to expand radially. Thus, the expansion anchor 10 is secured in the fitting hole H by the expanded portion of the corrugated portion 17.

Figure 3:
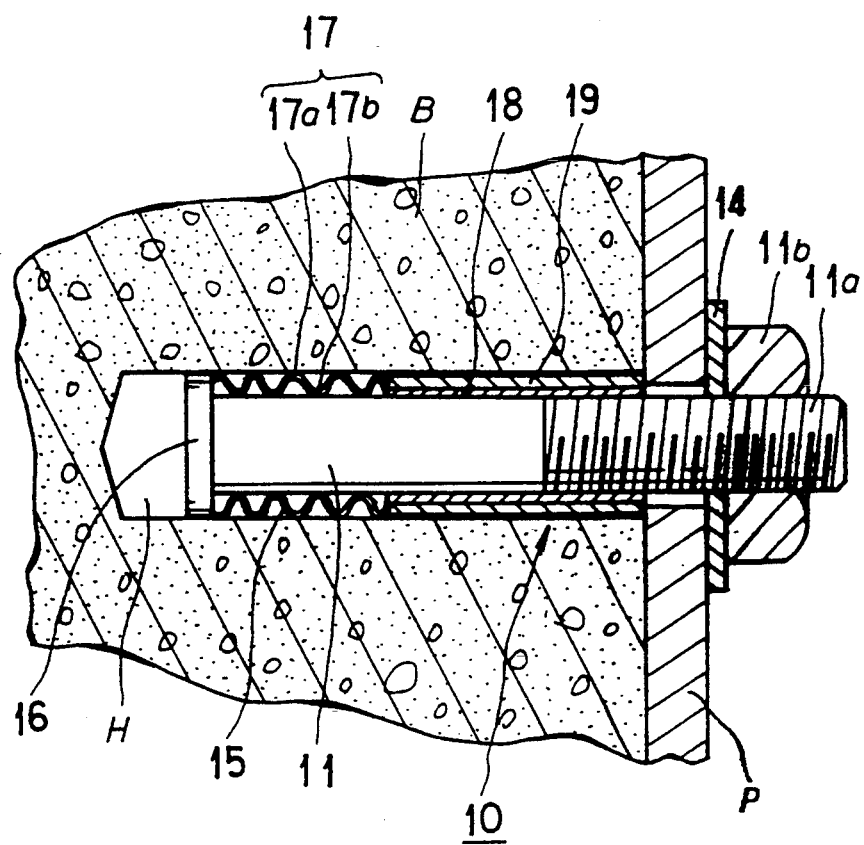
FIG. 3 is a side view, partly in section, of one embodiment of an expansion anchor according to this invention in the state of being inserted in a fitting hole.
Figure 4:
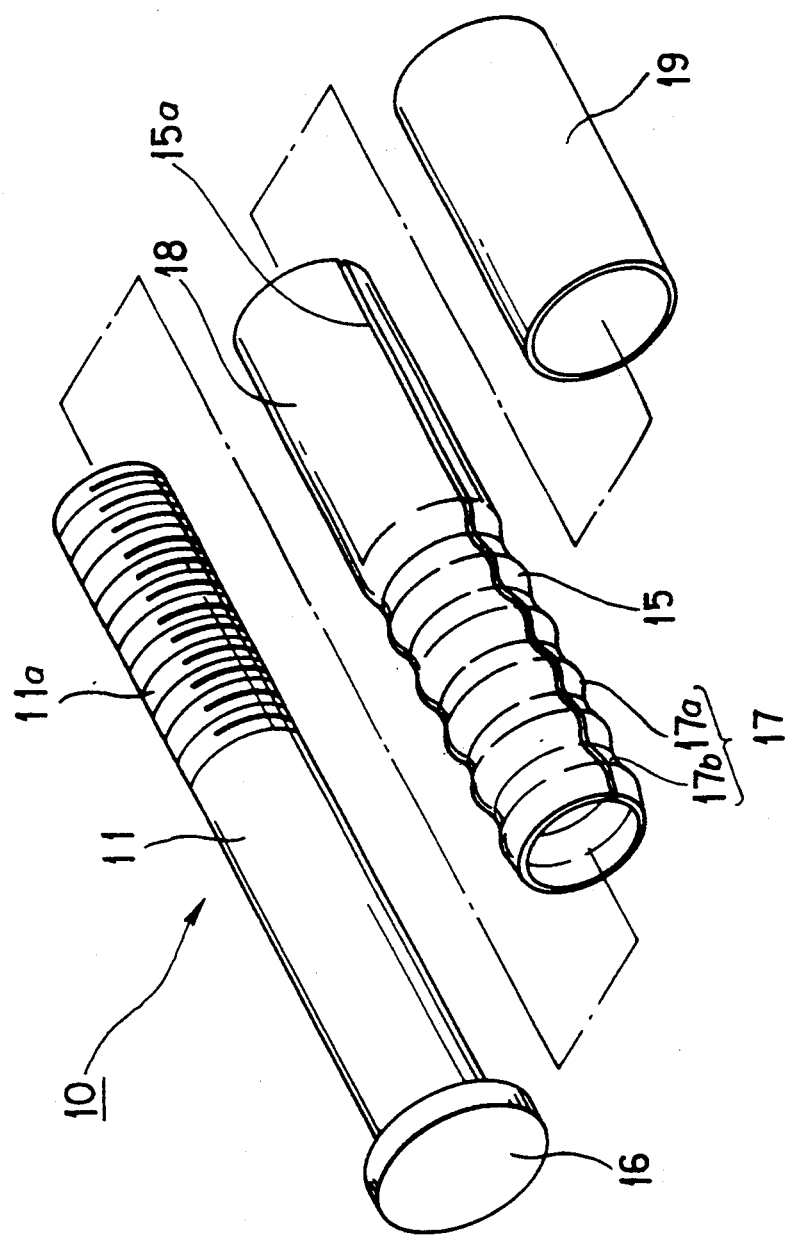
FIG. 4 is an exploded view of the expansion anchor of FIG. 3.

The holding strength brought about by the expansion anchor 10 secured in the fitting hole H may be insufficient because the anchor 10 is supported by only the rear end of the corrugated portion 17 which is squashed and expanded as shown in FIG. 6. However, by fitting the nut 11b to the threaded screw portion 11a and tightening the same, the holding flange 16 at the leading end of the anchor stem 11 is pulled backward to compress the front end of the corrugated portion 17. As a result, the entirety of the corrugated portion 17 is squashed and expands. As the nut is strongly to tightened up, the corrugated portion becomes more flattened, to thereby prevent the expansion anchor secured in the concrete foundation B from being easily removed from the fitting hole H. When the panel P is interposed between the nut 11b and the surface of the concrete foundation B as shown in FIG. 3, the panel P is fixedly secured to the concrete foundation B. In an experiment which the inventor conducted by use of the expansion anchor made of a copper plate of 0.5 mm in thickness as specified above, when the nut 11b screwed in the threaded screw portion 11a of the anchor stem 11 was tightened up until reaching the limit of union, the anchor 10 was not removed from the fitting hole H, but the threaded screw portion 11a was broken at last.

The straight portion 18 of the lock member 15 is not absolutely necessary to the expansion anchor of this invention but serves to improve the stability of squashing the corrugated portion 17. Although, in the foregoing embodiment the corrugated portion 17 is squashed by the thrusting force imparted with the striking tool RA and the pulling force brought about by tightening up the nut 11b, it can be sufficiently squashed only by thrusting the driving collar 19 with the striking tool RA.

As should be clear from the description above, the expansion anchor can be steadily secured with ease inside the fitting hole H bored in the concrete foundation B in a non-removable state regardless of the condition of the surface and dimensional accuracy of the fitting hole.

TABLE 1 below shows the results of the experiments which were made on the pull-out strength of the expansion anchor according to this invention by use of the Amsler universal testing machine. The experiments were conducted by pulling, at a pulling rate of 50 mm/min., the expansion anchors each having an anchor stem of 8 mm in diameter and a lock member of 10.5 mm in outer diameter which were secured in fitting holes bored in a concrete block of 100 cubic mm.

TABLE 1

| Specimen No. | Pull-out Strength (kg) | Time required for pulling out (sec) | Resultant State |
|---|---|---|---|
| #1 | 1380 | 88 | Concrete Broken |
| #2 | 1590 | 94 | |
| #3 | 1330 | 35 | |
| #4 | 1670 | 18 | |
| #5 | 1740 | 34 | |
| #6 | 1230 | 44 | |
| #7 | 1770 | 55 | |
| #8 | 1450 | 50 | |
| #9 | 1360 | 17 | |
| #10 | 1270 | 32 | |

Figure 7:
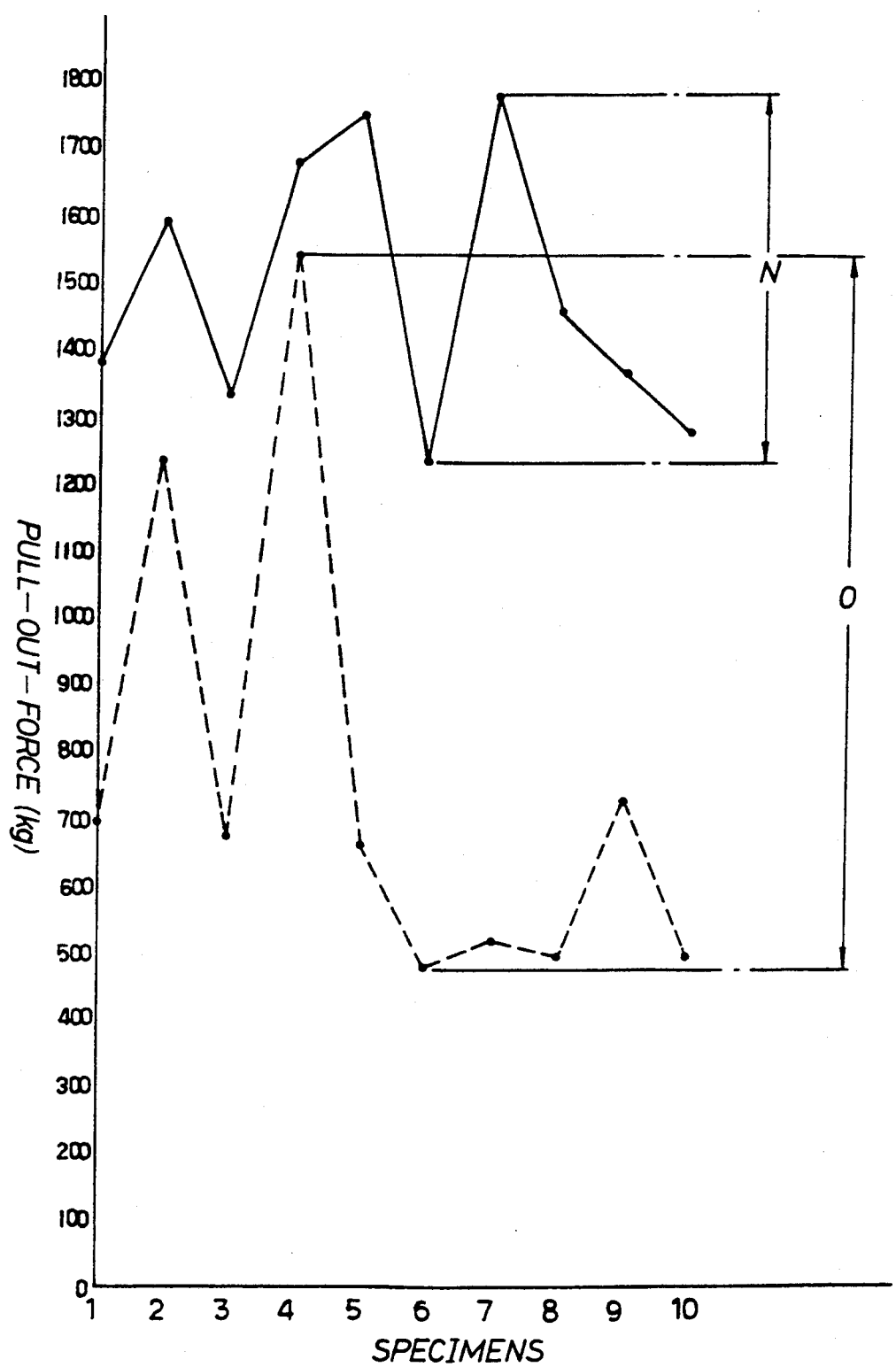
FIG. 7 is a graph showing the result of the pull-out comparative tests for a conventional anchor and the expansion anchor of this invention.

FIG. 7 is a graph showing the pull-out strength characteristic of the expansion anchors according to this invention specified in TABLE 1 above, compared with those of the conventional expansion anchors each having an anchor stem of 8 mm in diameter. In FIG. 7, the characteristic of the anchors according to this invention is plotted by a solid line, and those of the conventional anchors are plotted by a dotted line. And, "N" represents the dispersion of the pull-out strength characteristic of the anchors of this invention, and "O" represents that of the conventional anchors. As is evident from FIG. 7, according to this invention, the pull-out strength of the anchor exhibits improved stability of securing an object to a foundation of concrete or any other material.

Figure 8:
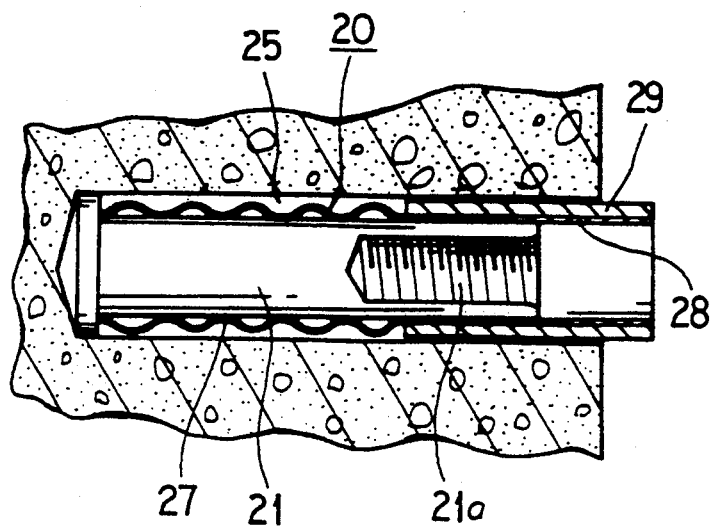
FIG. 8 is a side view, partly in section, of another embodiment of this invention, showing the anchor having the corrugated portion of the lock member before being squashed.
Figure 9:
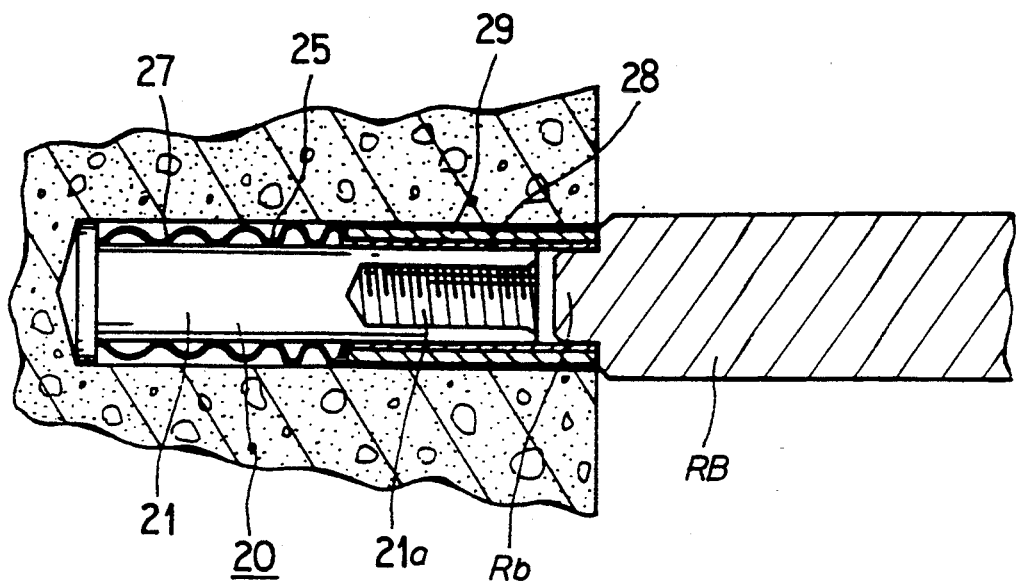
FIG. 9 is a similar side view of the expansion anchor of FIG. 8, showing the process in which the corrugated portion of the lock member is being squashed.

FIG. 8 through FIG. 10 show a second embodiment of the expansion anchor 20 of this invention. The anchor 20 is characterized by a female screw portion 21a made in an anchor stem 21 for receiving an object having a male screw or a bolt. After inserting the expansion anchor 20 into a fitting hole H as shown in FIG. 8, a lock member 25 having a corrugated portion 27 and a straight portion 28 integral with a driving collar 29 is driven in the fitting hole by use of a striking tool RB having an axial protrusion Rb inserted into the female screw portion 21a in the anchor stem 21 as shown in FIG. 9. As a result, the corrugated portion 27 is squashed to expand into engagement in a non-removable state with the inner surface defining the fitting hole as shown in FIG. 10, similarly to the first embodiment as described above.

Figure 11:
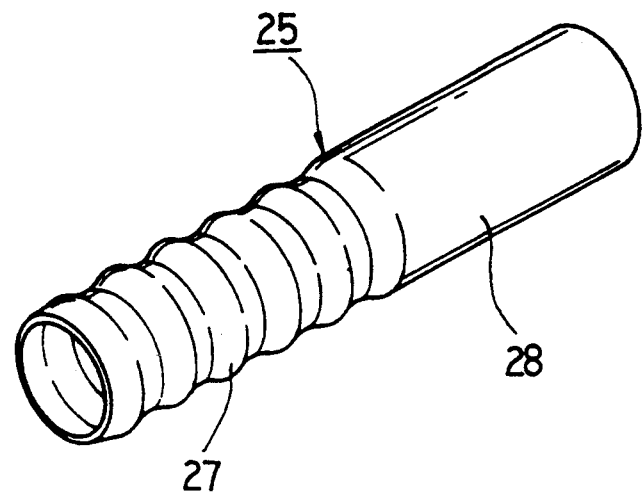
FIG. 11 is a perspective view of a lock member according to this invention.

Although the lock members of the anchors of the first and second embodiment each have the longitudinal expanding slits, the expanding slits are not absolutely necessary to this invention as illustrated by a third embodiment shown in FIG. 11. That is, the expansion anchor of the third embodiment comprises a lock member 25 having a corrugated portion 27 and a straight portion 28 but no expanding slit. This anchor can be made, for example, by subjecting a pipe to roll forming.

Figure 12:
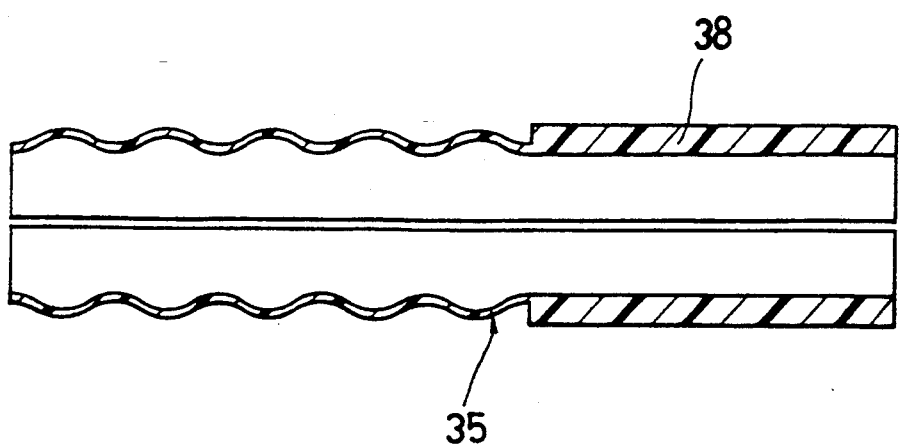
FIG. 12 is a longitudinal sectional view of another modified lock member according to this invention.

In a fourth embodiment shown in FIG. 12, the straight portion of the lock member and the driving collar in the foregoing embodiments are united in one body to form a thick straight portion 38. A lock member 35 having the thick straight portion 38 can be molded of synthetic resin, and of course, may be formed of metal or any other material.

Figure 13:
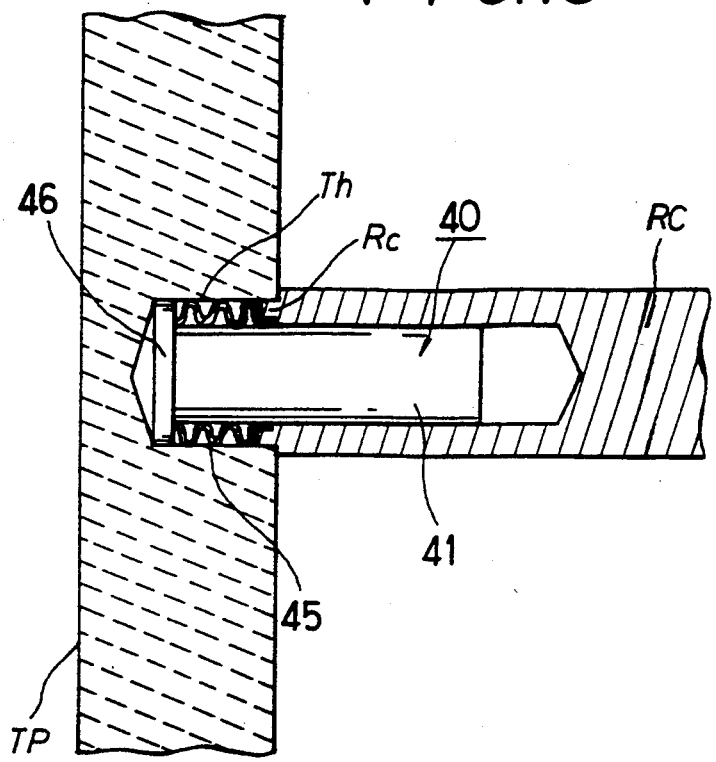
FIG. 13 is a side view, partly in section, of still another embodiment of this invention.

Another embodiment of an expansion anchor which can be used as a hook fixed in a porcelain tile or stone plate set into a wall or other possible foundation will be described with reference to FIGS. 13 and 14.

The illustrated expansion anchor 40 comprises an anchor stem 41 and a lock member 45. The anchor stem 41 has a holding flange 46 and is sufficiently longer than the depth of a fitting hole Th bored in the tile Tp. The lock member 45 is inserted in the fitting hole Th along with the anchor stem 41, and then, forced forward with a striking tool RC having an annular protrusion Rc, as shown in FIG. 13. Consequently, the lock member 45 is squashed to expand, thereby coming into engagement with the inner surface defining the fitting hole Th.

Figure 14:
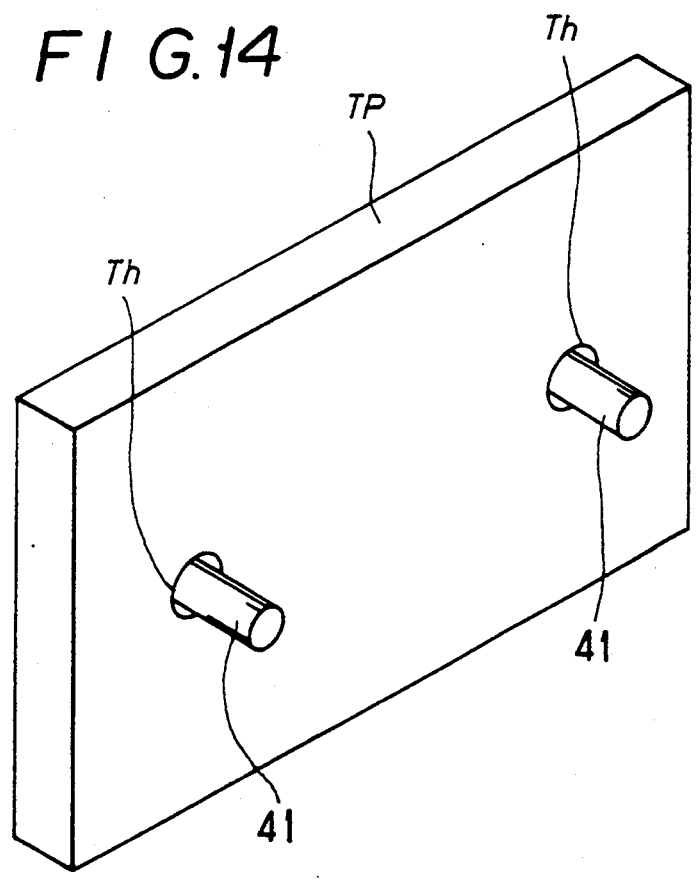
FIG. 14 is a perspective view of the structure shown in FIG. 13.

Thus, the expansion anchor of this embodiment can steadily be fixed in the tile with a simple operation without damaging the tile, and serves as a hook or reinforcing means as shown in FIG. 14. When the expansion anchor is secured in a more fragile material, the lock member 45 may be softly squeezed with the striking tool RC by, for example, using a hydraulic pressure system for making the striking force constant.

Figure 15A:
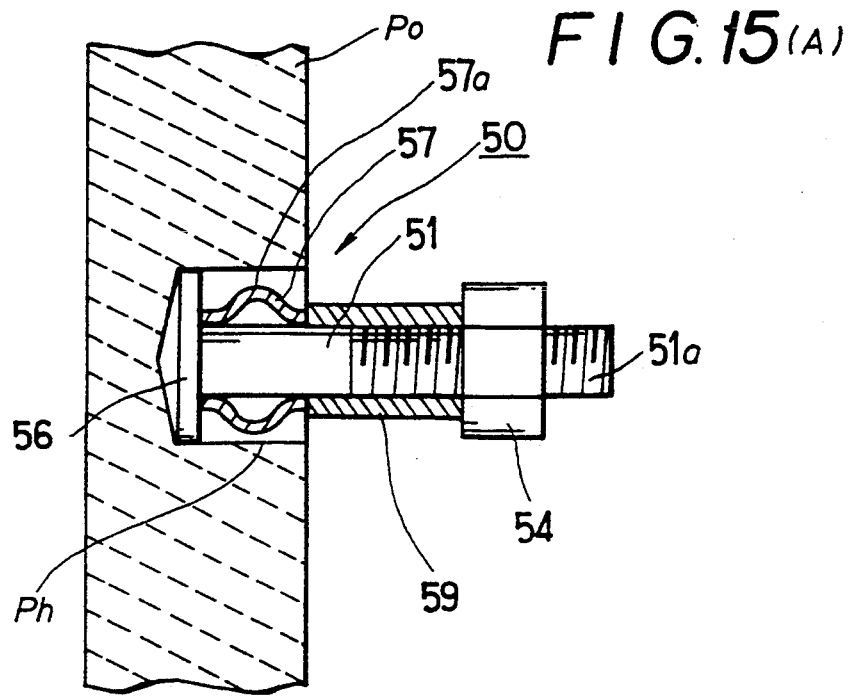
FIG. 15(A) and 15(B) are side views, partly in section, of yet another embodiment of this invention.
Figure 15B:
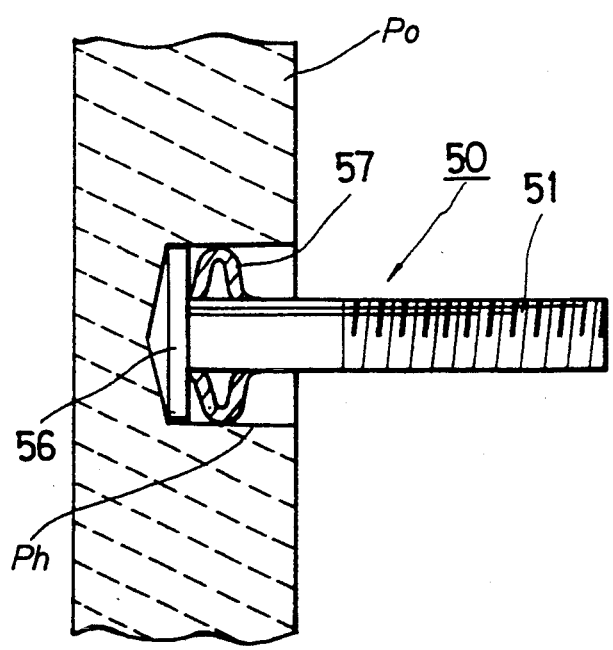

FIGS. 15(A) and 15(B) show a sixth embodiment using a modified lock member. An expansion anchor 50 in this embodiment comprises an anchor stem 51 having a threaded screw portion 51a and a holding flange 56, a nut 54 to be screwed onto the thread screw portion 51a of the anchor stem 51, a lock member 55 having a corrugated portion 57, and a driving collar 59. In this embodiment, the corrugated portion 57 has a single ridge 57a. This expansion anchor 50 can be applied to a relatively thick rigid panel of about 5 mm thick.

First, the panel Po is bored so as not to be pierced, thus forming a blind hole Ph. Then, the expansion anchor 50 into which the anchor stem 51, lock member 55, driving collar 59 and nut 54 are assembled is inserted in the fitting hole Ph, as shown in FIG. 15(A). Then, the nut 54 is screwed onto threaded portion 51a to squash the corrugated portion 57 of the lock member 55, thus expanding the ridge 57a outward. Consequently, the ridge 57a bites into the inner surface defining the fitting hole Ph to secure the expansion anchor in the panel in a non-removable state, as shown in FIG. 15(B).

Although the lock member 55 has one ridge 57a, it is a matter of course that the number and shape of ridges constituting the lock member are not limited and the lock ember may comprise two or more ridge and furrow portions similarly to the foregoing embodiments. Also, the lock member may be made of any material, for instance, copper, iron, aluminum, stainless steel and brass.

As is apparent from the foregoing description, the present invention provides an expansion anchor capable of being steadily secured in a rigid material or other foundation in a non-removable state with a simple operation. Since the corrugated portion of the lock member is squashed and entirely expanded by forcing forward the lock member, the frictional engagement between the expansion anchor and the inner surface defining the fitting hole bored in the rigid material is remarkably strong even if the fitting hole is not accurately formed, whereby the securement of the anchor is reliable.

Although the invention has been described in its preferred form with a certain degree of particularity, it is understood that various changes in the details of construction and the combination and arrangement of parts of the preferred embodiments may be resorted to without departing from the spirit and the scope of the invention as hereinafter claimed.

What is claimed is:

1. An expansion anchor to be secured in a fitting hole bored in a rigid object, which comprises: an anchor stem having a leading end and a holding flange attached to said leading end; a cylindrical lock member having a corrugated portion and a straight portion extending backward from said corrugated portion in a direction away from said leading end of the anchor stem, said anchor stem being received in said cylindrical lock member; and a driving collar integral with said straight portion of said lock member, said corrugated portion being squashed and expanded when said lock member is forced toward said holding flange by driving said driving collar, integral with the straight portion of said lock member, toward said holding flange.

2. An expansion anchor according to claim 1, wherein said anchor stem has a thread, and further comprising a nut to be screwed to said thread of the anchor stem.

3. An expansion anchor according to claim 1, wherein said anchor stem has a female threaded portion, and further comprising a male screw or bolt to be screwed into said female threaded portion of the anchor stem.

4. An expansion anchor according to claim 1, wherein said lock member has a longitudinal expanding slit.

5. An expansion anchor according to claim 1, wherein said lock member and driving collar are made of metal.

6. An expansion anchor according to claim 3, wherein said lock member and driving collar are of one body of synthetic resin.

7. An expansion anchor according to claim 1, wherein said corrugated portion comprises a plurality of ridges and furrows.

* * * * *